US011870850B2

(12) United States Patent
Song

(10) Patent No.: US 11,870,850 B2
(45) Date of Patent: Jan. 9, 2024

(54) METHOD AND APPARATUS FOR MANAGING LOG INFORMATION IN MACHINE-TO-MACHINE SYSTEM

(71) Applicants: Hyundai Motor Company, Seoul (KR); Kia Corporation, Seoul (KR); Industry Academy Cooperation Foundation of Sejong University, Seoul (KR)

(72) Inventor: Jae Seung Song, Seoul (KR)

(73) Assignees: Hyundai Motor Company, Seoul (KR); Kia Corporation, Seoul (KR); Industry Academy Cooperation Foundation of Sejong University, Seoul (KR)

( * ) Notice: Subject to any disclaimer, the term of this patent is extended or adjusted under 35 U.S.C. 154(b) by 0 days.

(21) Appl. No.: 17/795,378

(22) PCT Filed: Apr. 8, 2021

(86) PCT No.: PCT/KR2021/004430
§ 371 (c)(1),
(2) Date: Jul. 26, 2022

(87) PCT Pub. No.: WO2021/210847
PCT Pub. Date: Oct. 21, 2021

(65) Prior Publication Data
US 2023/0066685 A1    Mar. 2, 2023

Related U.S. Application Data

(60) Provisional application No. 63/009,035, filed on Apr. 13, 2020.

(51) Int. Cl.
*H04L 67/12* (2022.01)
*H04L 41/0894* (2022.01)

(52) U.S. Cl.
CPC .......... *H04L 67/12* (2013.01); *H04L 41/0894* (2022.05)

(58) Field of Classification Search
CPC . H04L 67/12; H04L 41/0894; H04L 65/1033; H04L 43/028; H04L 41/069; H04L 41/0806; H04L 67/51; H04W 4/70
See application file for complete search history.

(56) References Cited

U.S. PATENT DOCUMENTS

2005/0102564 A1* 5/2005 Oeda ................... G06F 11/3476
714/E11.204
2008/0195671 A1* 8/2008 Kim ..................... H04L 41/046
(Continued)

FOREIGN PATENT DOCUMENTS

JP    2005-275471 A    10/2005
KR    10-0747467 B1    8/2007
(Continued)

*Primary Examiner* — Kim T Nguyen
(74) *Attorney, Agent, or Firm* — Fox Rothschild LLP

(57) ABSTRACT

Disclosed herein are a method and apparatus for managing log information in a machine-to-machine (M2M) system, and a method for operating an M2M device in an M2M system may include receiving a first message for requesting to create a log management rule, creating storage for storing the log management rule and log information to be generated according to the log management rule, and setting a reference relationship between the log management rule and the storage.

15 Claims, 10 Drawing Sheets

(56) References Cited

U.S. PATENT DOCUMENTS

2017/0060914 A1* 3/2017 Narita .................. G06F 16/215
2019/0190940 A1 6/2019 Balakrishnan et al.

FOREIGN PATENT DOCUMENTS

KR 10-2014-0048659 A 4/2014
KR 10-2015-0135769 A 12/2015

* cited by examiner

METHOD AND APPARATUS FOR MANAGING LOG INFORMATION IN MACHINE-TO-MACHINE SYSTEM

CROSS-REFERENCE TO RELATED APPLICATION(S)

This application is a U.S. national stage application under 35 USC § 371 of International Application No. PCT/KR2021/004430, filed Apr. 8, 2021, claiming priority to U.S. Application No. 63/009,035, filed Apr. 13, 2020, each of which is incorporated by reference in its entirety into this application.

BACKGROUND OF THE INVENTION

Field of the Invention

The present invention relates to a method and apparatus for managing log information in a machine-to-machine (M2M) system. More particularly, the present invention relates to a method and apparatus for logging information associated with activities on resources in an M2M system.

Description of the Related Art

Recently, introduction of a Machine-to-Machine (M2M) system has become active. An M2M communication may refer to a communication performed between machines without human intervention. M2M may refer to Machine Type Communication (MTC), Internet of Things (IoT) or Device-to-Device (D2D). In the following description, the term "M2M" is uniformly used for convenience of explanation, but the present disclosure is not limited thereto. A terminal used for M2M communication may be an M2M terminal or an M2M device. An M2M terminal may generally be a device having low mobility while transmitting a small amount of data. Herein, the M2M terminal may be used in connection with an M2M server that centrally stores and manages inter-machine communication information. In addition, an M2M terminal may be applied to various systems such as object tracking, automobile linkage, and power metering.

Meanwhile, with respect to an M2M terminal, the oneM2M standardization organization provides requirements for M2M communication, things to things communication and IoT technology, and technologies for architecture, Application Program Interface (API) specifications, security solutions and interoperability. The specifications of the oneM2M standardization organization provide a framework to support a variety of applications and services such as smart cities, smart grids, connected cars, home automation, security and health.

SUMMARY

The present invention is directed to provide a method and apparatus for managing log information in a machine-to-machine (M2M) system.

The present invention is directed to providing a method and apparatus for logging information associated with activities on resources in an M2M system.

The present invention is directed to providing a method and apparatus for setting a rule associated with management of log information in an M2M system.

According to an embodiment of the present invention, a method for operating a machine-to-machine (M2M) device in an M2M system may include receiving a first message for requesting to create a log management rule, creating storage for storing the log management rule and log information to be generated according to the log management rule, and setting a reference relationship between the log management rule and the storage.

According to an embodiment of the present invention, a machine-to-machine (M2M) device in an M2M system may include a transceiver configured to receive and transmit a signal and a processor configured to control the transceiver, and the processor may be further configured to receive a first message for requesting to create a log management rule, to create storage for storing the log management rule and log information to be generated according to the log management rule, and to set a reference relationship between the log management rule and the storage.

According to an embodiment of the present invention, a machine-to-machine (M2M) device in an M2M system may include a transceiver configured to receive and transmit a signal and a processor configured to control the transceiver, and the processor may be further configured to transmit a first message for requesting to create a resource, which is subject to logging, based on a log management rule and to receive a second message for notifying that creation of the resource is completed, and the first message may include first information indicating being subject to the logging and second information indicating the log management rule.

According to the present disclosure, log information may be effectively managed in a machine-to-machine (M2M) system.

Effects obtained in the present disclosure are not limited to the above-mentioned effects, and other effects not mentioned above may be clearly understood by those skilled in the art from the following description.

DETAILED DESCRIPTION OF THE INVENTION

Figure 1:
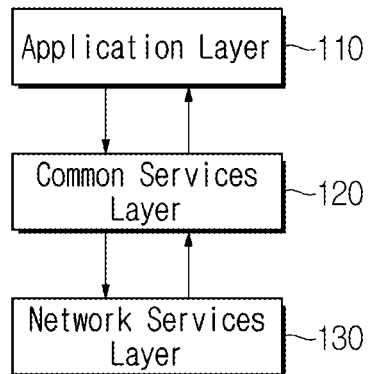
FIG. 1 illustrates a layered structure of a machine-to-machine (M2M) system according to the present disclosure.

Hereinafter, embodiments of the present disclosure will be described in detail with reference to the accompanying drawings, which will be easily implemented by those skilled in the art. However, the present disclosure may be embodied in many different forms and is not limited to the exemplary embodiments described herein.

In the present disclosure, the terms first, second, etc. are used only for the purpose of distinguishing one component from another, and do not limit the order or importance of components, etc. unless specifically stated otherwise. Thus, within the scope of this disclosure, a first component in one embodiment may be referred to as a second component in another embodiment, and similarly a second component in one embodiment may be referred to as a first component.

In the present disclosure, when a component is referred to as being "linked", "coupled", or "connected" to another component, it is understood that not only a direct connection relationship but also an indirect connection relationship through an intermediate component may also be included. Also, when a component is referred to as "comprising" or "having" another component, it may mean further inclusion of another component not the exclusion thereof, unless explicitly described to the contrary.

In the present disclosure, components that are distinguished from each other are intended to clearly illustrate each feature. However, it does not necessarily mean that the components are separate. In other words, a plurality of components may be integrated into one hardware or software unit, or a single component may be distributed into a plurality of hardware or software units. Thus, unless otherwise noted, such integrated or distributed embodiments are also included within the scope of the present disclosure.

In the present disclosure, components described in the various embodiments are not necessarily essential components, and some may be optional components. Accordingly, embodiments consisting of a subset of the components described in one embodiment are also included within the scope of the present disclosure. Also, exemplary embodiments that include other components in addition to the components described in the various exemplary embodiments are also included in the scope of the present disclosure.

In the following description of the embodiments of the present disclosure, a detailed description of known functions and configurations incorporated herein will be omitted when it may make the subject matter of the present disclosure rather unclear. Parts not related to the description of the present disclosure in the drawings are omitted, and like parts are denoted by similar reference numerals.

Although exemplary embodiment is described as using a plurality of units to perform the exemplary process, it is understood that the exemplary processes may also be performed by one or plurality of modules. Additionally, it is understood that the term controller/control unit refers to a hardware device that includes a memory and a processor and is specifically programmed to execute the processes described herein. The memory is configured to store the modules and the processor is specifically configured to execute said modules to perform one or more processes which are described further below.

In addition, the present specification describes a network based on Machine-to-Machine (M2M) communication, and a work in M2M communication network may be performed in a process of network control and data transmission in a system managing the communication network. In the present specification, an M2M terminal may be a terminal performing M2M communication. However, in consideration of backward compatibility, it may be a terminal operating in a wireless communication system. In other words, an M2M terminal may refer to a terminal operating based on M2M communication network but is not limited thereto. An M2M terminal may operate based on another wireless communication network and is not limited to the exemplary embodiment described above.

In addition, an M2M terminal may be fixed or have mobility. An M2M server refers to a server for M2M communication and may be a fixed station or a mobile station. In the present specification, an entity may refer to hardware like an M2M device, M2M gateway and M2M server. In addition, for example, an entity may be used to refer to a software configuration in a layered structure of an M2M system and is not limited to the embodiment described above.

In addition, for example, the present disclosure mainly describes an M2M system but is not solely applied thereto. In addition, an M2M server may be a server that performs communication with an M2M terminal or another M2M server. In addition, an M2M gateway may be a connection point between an M2M terminal and an M2M server. For example, when an M2M terminal and an M2M server have different networks, the M2M terminal and the M2M server may be connected to each other through an M2M gateway. Herein, for example, both an M2M gateway and an M2M server may be M2M terminals and are not limited to the embodiment described above.

The present invention relates to a method and apparatus for handling personal data in a machine-to-machine (M2M) system. More particularly, the present invention describes a technology for confirming consent to handle personal data in an M2M system.

Further, oneM2M is a de facto standards organization that was founded to develop a communal IoT service platform sharing and integrating application service infrastructure (platform) environments beyond fragmented service platform development structures limited to separate industries like energy, transportation, national defense and public service. oneM2M aims to render requirements for things to things communication and IoT technology, architectures, Application Program Interface (API) specifications, security solutions and interoperability. For example, the specifications of oneM2M provide a framework to support a variety of applications and services such as smart cities, smart grids, connected cars, home automation, security and health. In this regard, oneM2M has developed a set of standards defining a single horizontal platform for data exchange and sharing among all the applications. Applications across different industrial sections may also be considered by oneM2M. Like an operating system, oneM2M provides a framework connecting different technologies, thereby creating distributed software layers facilitating unification. Distributed software layers are implemented in a common services layer between M2M applications and communication Hardware/Software (HW/SW) rendering data transmission. For example, a common services layer may be a part of a layered structure illustrated in FIG. 1.

FIG. 1 is a view illustrating a layered structure of a Machine-to-Machine (M2M) system according to the present disclosure. Referring to FIG. 1, a layered structure of an M2M system may include an application layer 110, a common services layer 120 and a network services layer 130. Herein, the application layer 110 may be a layer operating based on a specific application. For example, an application may be a fleet tracking application, a remote blood sugar monitoring application, a power metering application or a controlling application. In other words, an application layer may a layer for a specific application.

Herein, an entity operating based on an application layer may be an application entity (AE).

The common services layer 120 may be a layer for a common service function (CSF). For example, the common services layer 120 may be a layer for providing common services like data management, device management, M2M service subscription management and location service. For example, an entity operating based on the common services layer 120 may be a common service entity (CSE).

The common services layer 120 may provide a set of services that are grouped into CSFs according to functions. A multiplicity of instantiated CSFs constitutes CSEs. CSEs may interface with applications (for example, application entities or AEs in the terminology of oneM2M), other CSEs and base networks (for example, network service entities or NSEs in the terminology of oneM2M). The network services layer 130 may provide the common services layer 120 with services such as device management, location service and device triggering. Herein, an entity operating based on the network layer 120 may be a network service entity (NSE).

Figure 2:
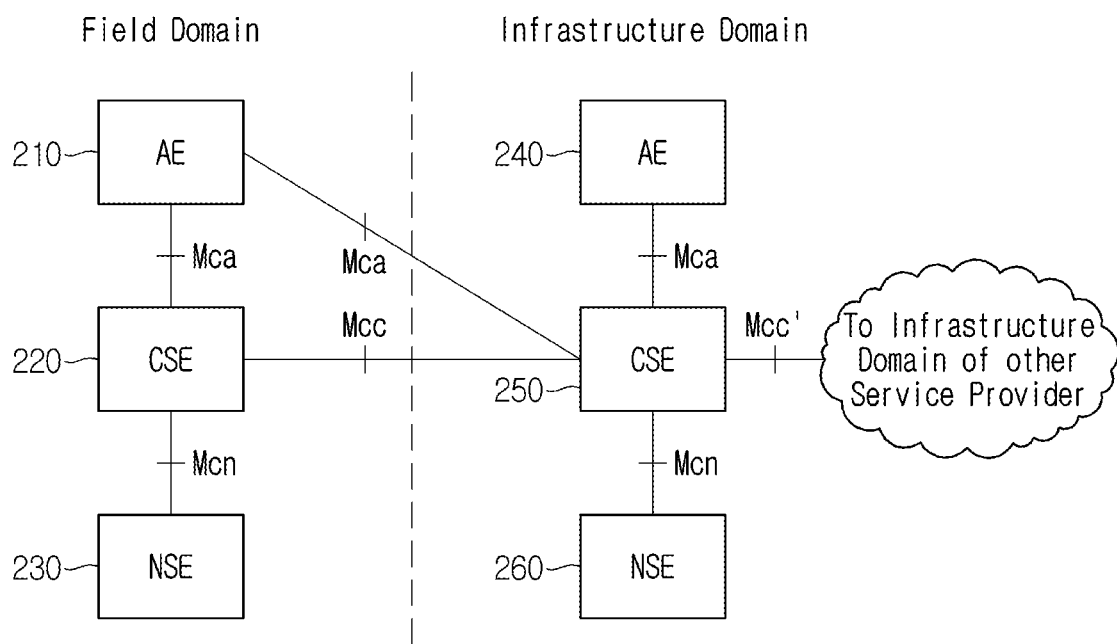
FIG. 2 illustrates a reference point in an M2M system according to the present disclosure.

FIG. 2 is a view illustrating reference points in an M2M system according to the present disclosure. Referring to FIG. 2, an M2M system structure may be distinguished into a field domain and an infrastructure domain. Herein, in each domain, each of the entities may perform communication through a reference point (for example, Mca or Mcc). For example, a reference point may indicate a communication flow between each entity. In particular, referring to FIG. 2, the reference point Mca between AE 210 or 240 and CSE 220 or 250, the reference point Mcc between different CSEs and Mcn reference point between CSE 220 or 250 and NSE 230 or 260 may be set.

Figure 3:
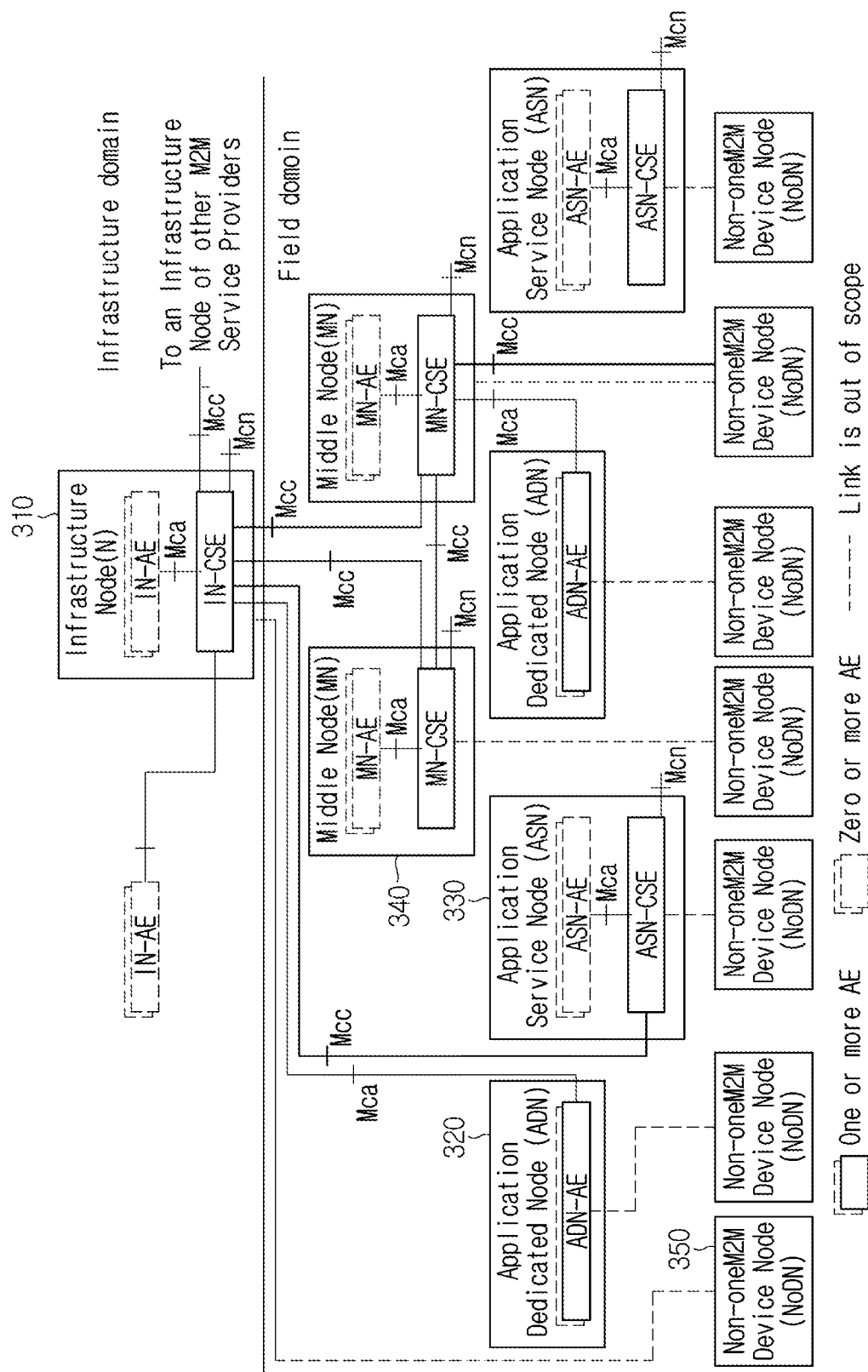
FIG. 3 illustrates each node in an M2M system according to the present disclosure.

FIG. 3 is a view illustrating each node in an M2M system according to the present disclosure. Referring to FIG. 3, an infrastructure domain of a specific M2M service provider may provide a specific infrastructure node (IN) 310. Herein, the CSE of the IN may be configured to perform communication based on the AE and the reference point Mca of another infrastructure node. In particular, one IN may be set for each M2M service provider. In other words, the IN may be a node that performs communication with the M2M terminal of another infrastructure based on an infrastructure structure. In addition, for example, conceptually, a node may be a logical entity or a software configuration.

Next, an application dedicated node (ADN) 320 may be a node including at least one AE but not CSE. In particular, an ADN may be set in the field domain. In other words, an ADN may be a dedicated node for AE. For example, an ADN may be a node that is set in an M2M terminal in hardware. In addition, the application service node (ASN) 330 may be a node including one CSE and at least one AE. ASN may be set in the field domain. In other words, it may be a node including AE and CSE. In particular, an ASN may be a node connected to an IN. For example, an ASN may be a node that is set in an M2M terminal in hardware.

In addition, a middle node (MN) 340 may be a node including a CSE and including zero or more AEs. In particular, the MN may be set in the field domain. An MN may be connected to another MN or IN based on a reference point. In addition, for example, an MN may be set in an M2M gateway in hardware. As an example, a non-M2M terminal node 350 (Non-M2M device node, NoDN) is a node that does not include M2M entities. It may be a node that performs management or collaboration together with an M2M system.

Figure 4:
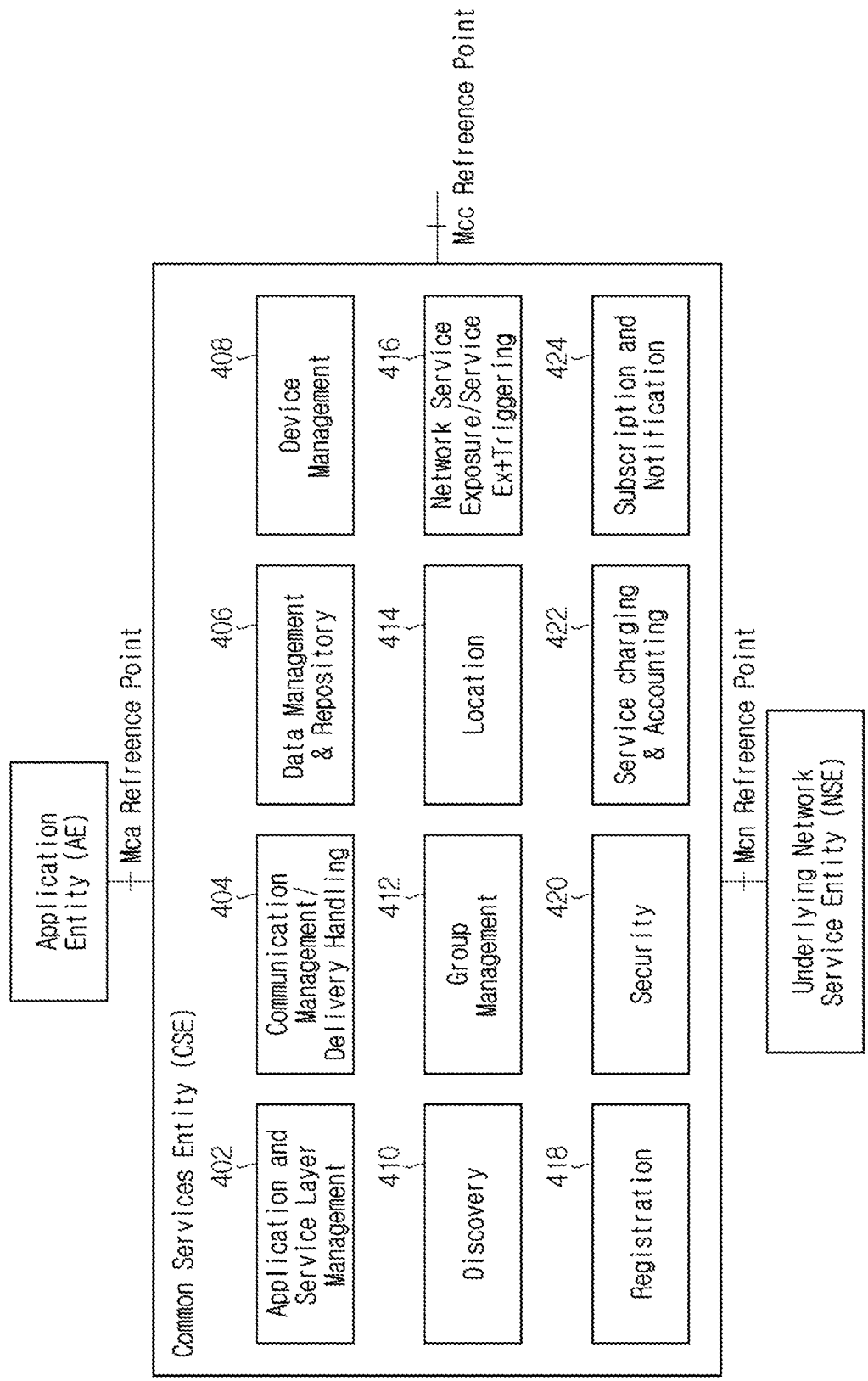
FIG. 4 illustrates a common service function in an M2M system according to the present disclosure.

FIG. 4 is a view illustrating a common service function in an M2M system according to the present disclosure. Referring to FIG. 4, common service functions may be provided. For example, a common service entity may provide at least one or more CSFs among application and service layer management 402, communication management and delivery handling 404, data management and repository 406, device management 408, discovery 410, group management 412, location 414, network service exposure/service execution and triggering 416, registration 418, security 420, service charging and accounting 422, service session management and subscription/notification 424. At this time, M2M terminals may operate based on a common service function. In addition, a common service function may be possible in other embodiments and is not limited to the above-described exemplary embodiment.

The application and service layer management 402 CSF provides management of AEs and CSEs. The application and service layer management 402 CSF includes not only the configuring, problem solving and upgrading of CSE functions but also the capability of upgrading AEs. The communication management and delivery handling 404 CSF provides communications with other CSEs, AEs and NSEs. The communication management and delivery handling 404 CSF are configured to determine at what time and through what connection communications are to be delivered, and also determines to buffer communication requests to deliver the communications later, if necessary and permitted.

The data management and repository 406 CSF provides data storage and transmission functions (for example, data collection for aggregation, data reformatting, and data storage for analysis and sematic processing). The device management 408 CSF provides the management of device capabilities in M2M gateways and M2M devices.

The discovery 410 CSF is configured to provide an information retrieval function for applications and services based on filter criteria. The group management 412 CSF provides processing of group-related requests. The group management 412 CSF enables an M2M system to support bulk operations for many devices and applications. The location 414 CSF is configured to enable AEs to obtain geographical location information.

The network service exposure/service execution and triggering 416 CSF manages communications with base networks for access to network service functions. The registration 418 CSF is configured to provide AEs (or other remote CSEs) to a CSE. The registration 418 CSF allows AEs (or remote CSE) to use services of CSE. The security 420 CSF is configured to provide a service layer with security functions like access control including identification, authentication and permission. The service charging and accounting 422 CSF is configured to provide charging functions for a service layer. The subscription/notification 424 CSF is configured to allow subscription to an event and notifying the occurrence of the event.

Figure 5:
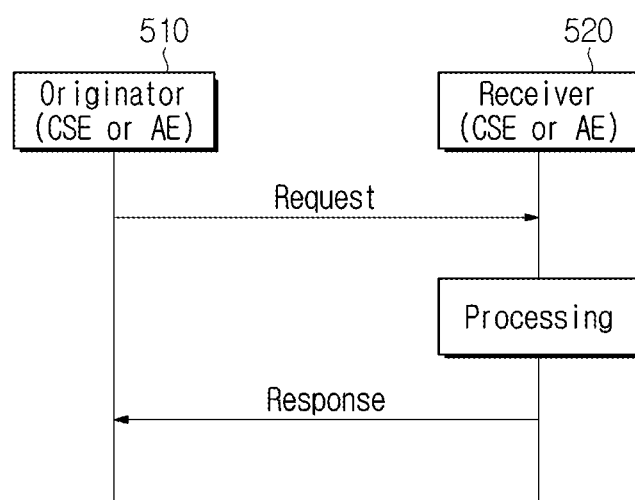
FIG. 5 illustrates a method in which an originator and a receiver exchange a message in an M2M system according to the present disclosure.

FIG. 5 is a view illustrating an originator and a receiver exchanging a message in an M2M system according to the present disclosure. Referring to FIG. 5, the originator 501 may be configured to transmit a request message to the receiver 520. In particular, the originator 510 and the receiver 520 may be the above-described M2M terminals. However, the originator 510 and the receiver 520 are not limited to M2M terminals but may be other terminals. They are not limited to the above-described exemplary embodiment. In addition, for example, the originator 510 and the receiver 520 may be nodes, entities, servers or gateways, which are described above. In other words, the originator 510 and the receiver 520 may be hardware or software configurations and are not limited to the above-described embodiment.

Herein, for example, a request message transmitted by the originator 510 may include at least one parameter. Additionally, a parameter may be a mandatory parameter or an optional parameter. For example, a parameter related to a transmission terminal, a parameter related to a receiving terminal, an identification parameter and an operation parameter may be mandatory parameters. In addition, optional parameters may be related to other types of information. In particular, a transmission terminal-related parameter may be a parameter for the originator 510. In addition, a receiving terminal-related parameter may be a parameter for the receiver 520. An identification parameter may be a parameter required for identification of each other.

Further, an operation parameter may be a parameter for distinguishing operations. For example, an operation parameter may be set to any one among Create, Retrieve, Update, Delete and Notify. In other words, the parameter may aim to distinguish operations. In response to receiving a request message from the originator 510, the receiver 520 may be configured to process the message. For example, the receiver 520 may be configured to perform an operation included in a request message. For the operation, the receiver 520 may be configured to determine whether a parameter is valid and authorized. In particular, in response to determining that a parameter is valid and authorized, the receiver 520 may be configured to check whether there is a requested resource and perform processing accordingly.

For example, in case an event occurs, the originator 510 may be configured to transmit a request message including a parameter for notification to the receiver 520. The receiver 520 may be configured to check a parameter for a notification included in a request message and may perform an operation accordingly. The receiver 520 may be configured to transmit a response message to the originator 510.

A message exchange process using a request message and a response message, as illustrated in FIG. 5, may be performed between AE and CSE based on the reference point Mca or between CSEs based on the reference point Mcc. In other words, the originator 510 may be an AE or CSE, and the receiver 520 may be an AE or CSE. According to an operation in a request message, such a message exchange process as illustrated in FIG. 5 may be initiated by either AE or CSE.

A request from a requestor to a receiver through the reference points Mca and Mcc may include at least one mandatory parameter and at least one optional parameter. In other words, each defined parameter may be either mandatory or optional according to a requested operation. For example, a response message may include at least one parameter among those listed in Table 1 below.

TABLE 1

Response message parameter/success or not

Response Status Code - successful, unsuccessful, ack
Request Identifier - uniquely identifies a Request message
Content - to be transferred
To - the identifier of the Originator or the Transit CSE that sent the corresponding non-blocking request
From - the identifier of the Receiver
Originating Timestamp - when the message was built
Result Expiration Timestamp - when the message expires
Event Category - what event category shall be used for the response message TABLE 1-continued Response message parameter/success or not Content Status
Content Offset
Token Request Information
Assigned Token Identifiers
Authorization Signature Request Information
Release Version Indicator - the oneM2M release version that this response message conforms to A filter criteria condition, which can be used in a request message or a response message, may be defined as in Table 2 and Table 3 below.

TABLE 2

| Condition tag | Multi-plicity | Description Matching Conditions |
|---|---|---|
| createdBefore | 0 . . . 1 | The creationTime attribute of the matched resource is chronologically before the specified value. |
| createdAfter | 0 . . . 1 | The creationTime attribute of the matched resource is chronologically after the specified value. |
| modifiedSince | 0 . . . 1 | The lastModifiedTime attribute of the matched resource is chronologically after the specified value. |
| unmodifiedSince | 0 . . . 1 | The lastModifiedTime attribute of the matched resource is chronologically before the specified value. |
| stateTagSmaller | 0 . . . 1 | The stateTag attribute of the matched resource is smaller than the specified value. |
| stateTagBigger | 0 . . . 1 | The stateTag attribute of the matched resource is bigger than the specified value. |
| expireBefore | 0 . . . 1 | The expirationTime attribute of the matched resource is chronologically before the specified value. |
| expireAfter | 0 . . . 1 | The expirationTime attribute of the matched resource is chronologically after the specified value. |
| labels | 0 . . . 1 | The labels attribute of the matched resource matches the specified value. |
| labelsQuery | 0 . . . 1 | The value is an expression for the filtering of labels attribute of resource when it is of key-value pair format. The expression is about the relationship between label-key and label-value which may include equal to or not equal to, within or not within a specified set etc. For example, label-key equals to label value, or label-key within {label-value1, label-value2}. Details are defined in [3] |
| childLabels | 0 . . . 1 | A child of the matched resource has labels attributes matching the specified value. The evaluation is the same as for the labels attribute above. Details are defined in [3]. |
| parentLabels | 0 . . . 1 | The parent of the matched resource has labels attributes matching the specified value. The evaluation is the same as for the labels attribute above. Details are defined in [3]. |
| resourceType | 0 . . . n | The resourceType attribute of the matched resource is the same as the specified value. It also allows differentiating between normal and announced resources. |
| childResourceType | 0 . . . n | A child of the matched resource has the resourceType attribute the same as the specified value. |
| parentResourceType | 0 . . . 1 | The parent of the matched resource has the resourceType attribute the |

TABLE 2-continued

Matching Conditions

| Condition tag | Multiplicity | Description |
|---|---|---|
| sizeAbove | 0 . . . 1 | same as the specified value. The contentSize attribute of the <contentInstance> matched resource is equal to or greater than the specified value. |
| sizeBelow | 0 . . . 1 | The contentSize attribute of the <contentInstance> matched resource is smaller than the specified value. |
| contentType | 0 . . . n | The contentInfo attribute of the <contentInstance> matched resource matches the specified value. |
| attribute | 0 . . . n | This is an attribute of resource types (clause 9.6). Therefore, a real tag name is variable and depends on its usage and the value of the attribute can have wild card *. E.g., creator of container resource type can be used as a filter criteria tag as "creator = Sam", "creator = Sam*", "creator = *Sam". |
| childAttribute | 0 . . . n | A child of the matched resource meets the condition provided. The evaluation of this condition is similar to the attribute matching condition above. |
| parentAttribute | 0 . . . n | The parent of the matched resource meets the condition provided. The evaluation of this condition is similar to the attribute matching condition above. |
| semanticsFilter | 0 . . . n | Both semantic resource discovery and semantic query use semanticsFilter to specify a query statement that shall be specified in the SPARQL query language [5]. When a CSE receives a RETRIEVE request including a semanticsFilter, and the Semantic Query Indicator parameter is also present in the request, the request shall be processed as a semantic query; otherwise, the request shall be processed as a semantic resource discovery. In the case of semantic resource discovery targeting a specific resource, if the semantic description contained in the <semanticDescriptor> of a child resource matches the semanticFilter, the URI of this child resource will be included in the semantic resource discovery result. In the case of semantic query, given a received semantic query request and its query scope, the SPARQL query statement shall be executed over aggregated semantic information collected from the semantic resource(s) in the query scope and the produced output will be the result of this semantic query. Examples for matching semantic filters in SPARQL to semantic descriptions can be found in [i.28]. |
| filterOperation | 0 . . . 1 | Indicates the logical operation (AND/OR) to be used for different condition tags. The default value is logical AND. |
| contentFilterSyntax | 0 . . . 1 | Indicates the Identifier for syntax to be applied for content-based discovery. |
| contentFilterQuery | 0 . . . 1 | The query string shall be specified when contentFilterSyntax parameter is present. |

TABLE 3

Filter Handling Conditions

| Condition tag | Multiplicity | Description |
|---|---|---|
| filterUsage | 0 . . . 1 | Indicates how the filter criteria is used. If provided, possible values are 'discovery' and 'IPEOnDemandDiscovery'. If this parameter is not provided, the Retrieve operation is a generic retrieve operation and the content of the child resources fitting the filter criteria is returned. If filterUsage is 'discovery', the Retrieve operation is for resource discovery (clause 10.2.6), i.e. only the addresses of the child resources are returned. If filterUsage is 'IPEOnDemandDiscovery', the other filter conditions are sent to the IPE as well as the discovery Originator ID. When the IPE successfully generates new resources matching with the conditions, then the resource address(es) shall be returned. This value shall only be valid for the Retrieve request targeting an <AE> resource that represents the IPE. |
| limit | 0 . . . 1 | The maximum number of resources to be included in the filtering result. This may be modified by the Hosting CSE. When it is modified, then the new value shall be smaller than the suggested value by the Originator. |
| level | 0 . . . 1 | The maximum level of resource tree that the Hosting CSE shall perform the operation starting from the target resource (i.e. To parameter). This shall only be applied for Retrieve operation. The level of the target resource itself is zero and the level of the direct children of the target is one. |
| offset | 0 . . . 1 | The number of direct child and descendant resources that a Hosting CSE shall skip over and not include within a Retrieve response when processing a Retrieve request to a targeted resource. |
| applyRelativePath | 0 . . . 1 | This attribute contains a resource tree relative path (e.g., . . . /tempContainer/LATEST). This condition applies after all the matching conditions have been used (i.e. a matching result has been obtained). The attribute determines the set of resource(s) in the final filtering result. The filtering result is computed by appending the relative path to the path(s) in the matching result. All resources whose Resource-IDs match that combined path(s) shall be returned in the filtering result. If the relative path does not represent a valid resource, the outcome is the same as if no match was found, i.e. there is no corresponding entry in the filtering result. |

A response to a request for accessing a resource through the reference points Mca and Mcc may include at least one mandatory parameter and at least one optional parameter. In other words, each defined parameter may be either mandatory or optional according to a requested operation or a mandatory response code. For example, a request message may include at least one parameter among those listed in Table 4 below.

TABLE 4

Request message parameter

| | |
|---|---|
| Mandatory | Operation - operation to be executed/CREAT, Retrieve, Update, Delete, Notify |
| | To - the address of the target resource on the target CSE |
| | From - the identifier of the message Originator |
| | Request Identifier - uniquely identifies a Request message |
| Operation dependent | Content - to be transferred |
| | Resource Type - of resource to be created |
| Optional | Originating Timestamp - when the message was built |
| | Request Expiration Timestamp - when the request message expires |
| | Result Expiration Timestamp - when the result message expires |
| | Operational Execution Time - the time when the specified operation is to be executed by the target CSE |
| | Response Type - type of response that shall be sent to the Originator |
| | Result Persistence - the duration for which the reference containing the responses is to persist |
| | Result Content - the expected components of the result |
| | Event Category - indicates how and when the system should deliver the message |
| | Delivery Aggregation - aggregation of requests to the same target CSE is to be used |
| | Group Request Identifier - Identifier added to the group request that is to be fanned out to each member of the group |
| | Group Request Target Members-indicates subset of members of a group |
| | Filter Criteria - conditions for filtered retrieve operation |
| | Desired Identifier Result Type - format of resource identifiers returned |
| | Token Request Indicator - indicating that the Originator may attempt Token Request procedure (for Dynamic Authorization) if initiated by the Receiver |
| | Tokens - for use in dynamic authorization |
| | Token IDs - for use in dynamic authorization |
| | Role IDs - for use in role based access control |
| | Local Token IDs - for use in dynamic authorization |
| | Authorization Signature Indicator - for use in Authorization Relationship Mapping |
| | Authorization Signature - for use in Authorization Relationship Mapping |
| | Authorization Relationship Indicator - for use in Authorization Relationship Mapping |
| | Semantic Query Indicator - for use in semantic queries |
| | Release Version Indicator - the oneM2M release version that this request message conforms to. |
| | Vendor Information |

A normal resource includes a complete set of representations of data constituting the base of information to be managed. Unless qualified as either "virtual" or "announced", the resource types in the present document are normal resources. A virtual resource is used to trigger processing and/or a retrieve result. However, a virtual resource does not have a permanent representation in a CSE. An announced resource contains a set of attributes of an original resource. When an original resource changes, an announced resource is automatically updated by the hosting CSE of the original resource. The announced resource contains a link to the original resource. Resource announcement enables resource discovery. An announced resource at a remote CSE may be used to create a child resource at a remote CSE, which is not present as a child of an original resource or is not an announced child thereof.

To support resource announcement, an additional column in a resource template may specify attributes to be announced for inclusion in an associated announced resource type. For each announced <resourceType>, the addition of suffix "Annc" to the original <resourceType> may be used to indicate its associated announced resource type. For example, resource <containerAnnc> may indicate the announced resource type for <container> resource, and <groupAnnc> may indicate the announced resource type for <group> resource.

The General Data Protection Regulation (GDPR) is a regulation in EU law on data protection and privacy for all individual citizens of the European Union (EU) and the European Economic Area (EEA). Business processes that handle personal data should be designed and built with consideration of the principles and provide safeguards to protect data. In addition, business processes that handle personal data use the highest-possible privacy setting by default, so that the data is not available publicly without explicit, informed consent, and cannot be used to identify a subject without additional information stored separately. Under GDPR, processing personal data is generally prohibited, unless it is expressly allowed by law, or the data subject has consented to the processing.

Several articles point out that the processor has to monitor activities on data for various purposes. For example, the processor shall notify the controller without undue delay after becoming aware of a personal data breach. Therefore, how to have a proper logging mechanism in an IoT system is a very important matter.

There are several issues in defining a logging mechanism. An IoT system like a oneM2M system may support logging information in the following respects.

Access to resources: who has accessed a given resource?
Types of access: what types of access (operations) have been made?
Time, date: when the given event happens?
Location: where the given event happens?
Level: how to specify which one is important and which one is not?
Purpose: what is the purpose of logging? (e.g., billing, security)
Where to store: where to store log information?

In addition, in a logging mechanism, a resource may have properties related to indication for logging information. For example, properties may designate a toggle of logging, what to log, when to log, a type of logging (e.g., user, system) and the like.

According to a logging mechanism, a oneM2M system may perform the following operations. A oneM2M system checks whether or not a given resource is subject to system logging. When it is subject to system logging, the oneM2M system checks whether or not a given operation is subject to logging. When it is subject to logging, the oneM2M system determines what type of log should be provided to where. In addition, the oneM2M system may support a means or information (e.g., log information) to be used by an intrusion prevention and detection system.

A property related to logging may be added to an existing resource. For example, a first property indicates whether or not a resource having the property is subject to system logging. The first property may be created under any resource. The first property may be referred to as 'logIndication'. For example, a second property may indicate which log rule is to be followed. A uniform resource identifier (URI), which refers to a resource related to a log management rule, may be added. The second property may be referred to as 'eventLogID'.

A resource type for setting a log management rule may be defined. A resource (hereinafter referred to as 'log management rule resource' or 'log management resource') for setting a log management rule may be referred to as <logMgtRule>. A log management rule resource may be used to define events to be logged to a system. A log management rule resource may be used to define a logging-related rule and an event that triggers logging. A log management rule resource may contain at least one of the child resources specified in Table 5 below. In other words, a log management rule resource may contain at least one of the properties listed in Table 5 below.

TABLE 5

| Attribute name | Description |
| --- | --- |
| logStart | When to start this log record |
| logEnd | When to end this log record |
| logCriteria | This is a property to provide which information should be logged. For example, if all the operations on the resource have to be logged, CRUDN has to be mentioned in this property. |
| logFormat | This is a property to provide what kinds of log information have to be stored under which format. Default formats could be defined as <event time, origin, operation, target resource, results>. Additionally, ip address of Origin, binding protocols, etc. may be logged. Each item may be separated using a delimiter such as ';'. |
| logLevel | Level of log information. For example, store all information, store only successfill events, store only failed events. |
| logResourceIDs | A list of resource IDs to be logged |
| logStorage | A reference to a resource in which actual log records are stored |

Figure 6:
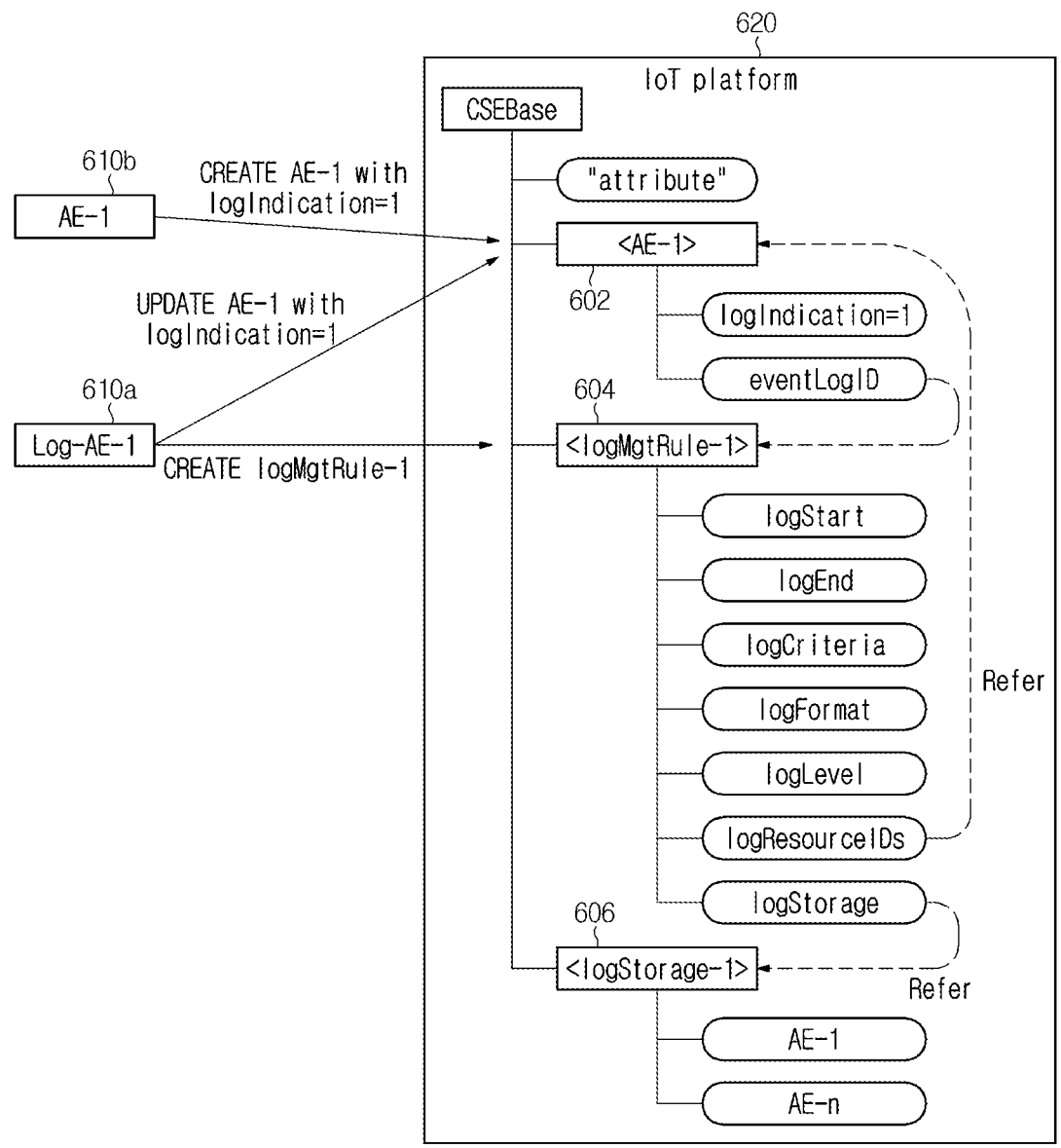
FIG. 6 illustrates a concept of log management in an M2M system according to the present disclosure.

FIG. 6 illustrates a concept of log management in an M2M system according to the present disclosure. FIG. 6 illustrates a reference relationship among a resource <AE-1> 602, a log management rule <logMgtRule-1> 604, and storage <logStorage-1> 606.

Referring to FIG. 6, an IoT platform 620 creates the log management rule (e.g., <logMgtRule-1> 604) according to a request of log-AE 610a. In addition, the IoT platform 620 creates the resource <AE-1> 602 according to a request of AE-1 610b. Herein, the resource <AE-1> 602 may contain an attribute (e.g., eventLogID) indicating a log management rule (e.g., <logMgtRule-1> 604) applicable to the resource <AE-1> 602.

<logMgtRule-1> 604 may contain an attribute (e.g., logResourceIDs) indicating a resource that follows the rule, and the attribute may refer to the resource <AE-1> 602. When creating <logMgtRule-1> 604, <log-Storage-1> 606 may be created as a resource (hereinafter referred to as 'log storage resource' or 'log resource') to be used as storage for storing log information. In this case, <logMgtRule-1> 604 may contain an attribute (e.g., logStorage) indicating a resource for storing log information that is created according to the rule, and the attribute may refer to <log-Storage-1> 606.

After <logMgtRule-1> 604 and Storage-1 606 are created, update of the resource <AE-1> 602 may be requested by the log-AE-1 610a. In this case, log information is created according to <logMgtRule-1> 604 indicated by eventLogID, and the created log information may be stored in <logStorage-1> 606 referred to by logStorage.

Figure 7:
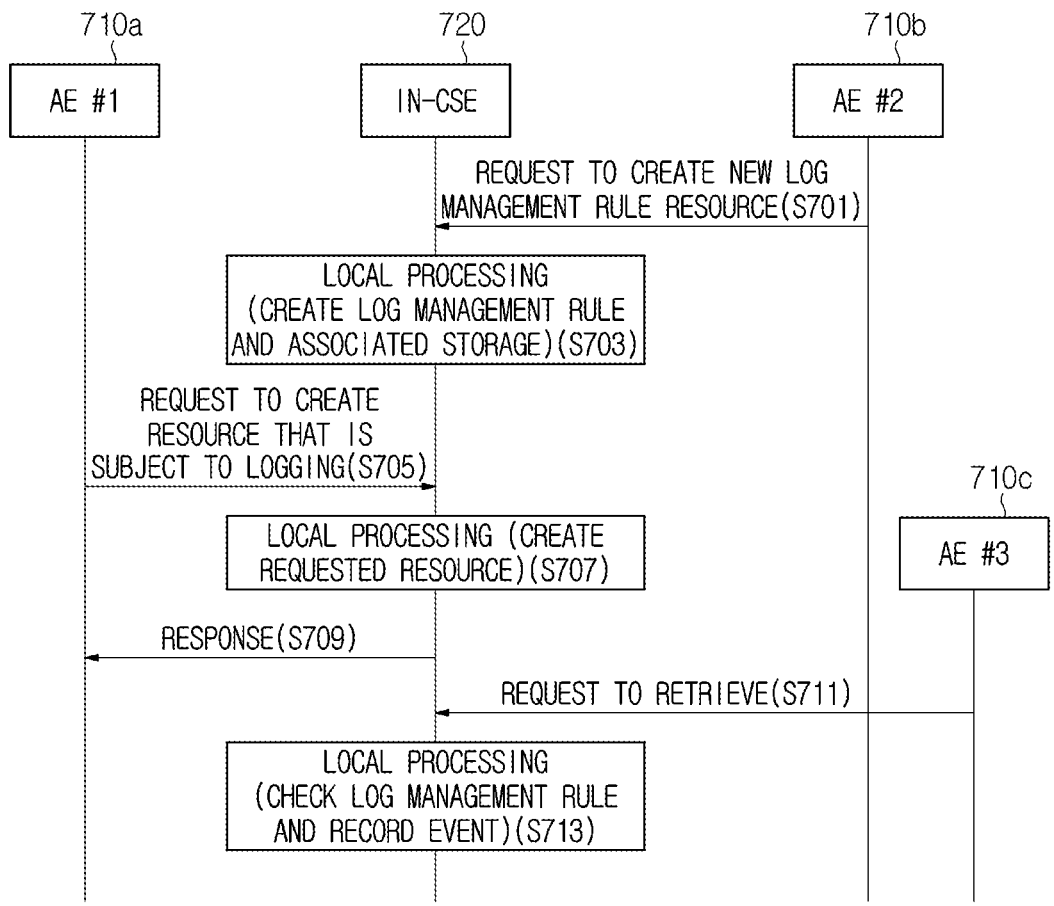
FIG. 7 illustrates an example of signal exchange for managing log information in an M2M system according to the present disclosure.

FIG. 7 illustrates an example of a signal exchange for managing log information in an M2M system according to the present disclosure. FIG. 7 exemplifies the signal exchange among AE #1 710a, AE #2 710b, AE #3 710c and IN-CSE 730.

Referring to FIG. 7, at step S701, AE #2 710b transmits a message for requesting to create a log management rule resource to IN-CSE 720. For example, AE #2 710b may request to create a new logMgtRule resource for logging. According to an embodiment, the message may include information necessary for creating the logMgtRule resource. For example, the message may include a value of at least one of the attributed listed in Table 5.

At step S703, IN-CSE 720 performs local processing to create a log management rule and relevant storage. For example, IN-CSE 720 may create a resource <logMgtRule1> as the log management rule and create <logStorage1> as storage. According to an embodiment, the resource <logMgtRule1> may include a plurality of attributes, and a value of at least one of the attributes may be set based on the information contained in the message received at step S701.

At step S705, AE #1 710a transmits a message for requesting to create a resource, which is subject to logging, to IN-CSE 720. Herein, the message may include first information (e.g., logIndication), which indicates that the resource is subject to logging, and second information (e.g., eventLogID) indicating a log management rule (e.g., logMgtRule resource) to be applied to the logging of the resource. For example, AE #1 710a may request to create a resource that has a attribute, which indicates that it is subject to logging, and a attribute that refers to a log management rule. For this, AE #1 710a may obtain, through a separate procedure, information on the resource <logMgtRule1> created at step S703. For example, AE #1 710a may obtain information on the resource <logMgtRule1> during a process of setting a connection to IN-CSE 720 or obtain information on the resource <logMgtRule1> from AE #2 710b.

At step S707, IN-CSE 720 performs local processing for creating a requested resource. For example, IN-CSE 720 may create a resource requested by AE #1 710a together with logging information and include, in the resource, first information (e.g., logIndication), which indicates that the resource is subject to logging, and second information (e.g., eventLogID) indicating a log management rule to be applied to logging of the resource. Herein, the first information may be set to a positive value (e.g., 1), and the second information may be set to a value indicating the resource <logMgtRule1>.

At step S709, IN-CSE 720 transmits a response message. That is, IN-CSE 720 transmits, to AE #1 710a, a response for notifying that the requested resource is successfully created.

At step S711, AE #3 710c transmits, to IN-CSE 720, a message for retrieving a resource (e.g., AE #1) that is created according to the request of AE #1 710a. That is, AE #3 710c requests an operation related to the resource (e.g., AE #1) created according to the request of AE #1 710a.

At step S713, IN-CSE 720 performs local processing to check the log management rule and the record an event. Specifically, IN-CSE 720 performs an operation (e.g., RETRIEVE) requested by AE #3 710*c* and logs information on the performed operation. For this, IN-CSE 720 may determine whether or not a resource related to a requested operation and the operation are subject to logging, create log information and store the log information in designated storage.

As described in FIG. 7, a log management rule may be utilized. That is, at a request of AE #2 710*b*, according to a log management rule, log information on an activity of AE #3 730*c* for a resource created by AE #1 710*a* may be recorded.

According to an embodiment, the log management resource <logMgtRule1> may be created in IN-CSE 720 by a log management application. Herein, a logMgtRule resource may be provided. When a resource is created, the log management application may create a resource for storing an actual log record. That is, <logStorage1> may be created. In a use case like this embodiment, <logMgtRule1> may be configured so that the logStorage attribute refers to an address of the <logMgtRule1> resource and the 'logFormat' attribute is configured as 'time;originator;operation;target;status'. The logResourceIDs attribute may be configured as AE #1. The logLevel attribute may be configured to all request messages. The logCriteria attribute may be configured as CRUDN.

For example, a human body sensor application may request IN-CSE 720 to create AE #1 with logIndication. The human body sensor application may refer to <logMgtRule1> as a logging rule to be followed. IN-CSE 720 may add AE #1 to logResourceID of <logMgtRule1> in order to start logging for AE #1.

AE #2 710*b* attempts to read the AE #1 resource in order to show a value to a user of AE #2 710*b*. When IN-CSE 720 receives a request, IN-CSE 720 performs an operation. IN-CSE 720 checks whether or not a corresponding message should be recorded in a log resource. When AE #1 is subject to logging, IN-CSE 720 may obtain necessary information such as which entity attempted to read, when the message is received, whether or not binding is used, and what is a result of request, and store collected information in an adequate resource. In this case, <logStorage1>/<AE #1> is a place for recording a processed request.

Figure 8:
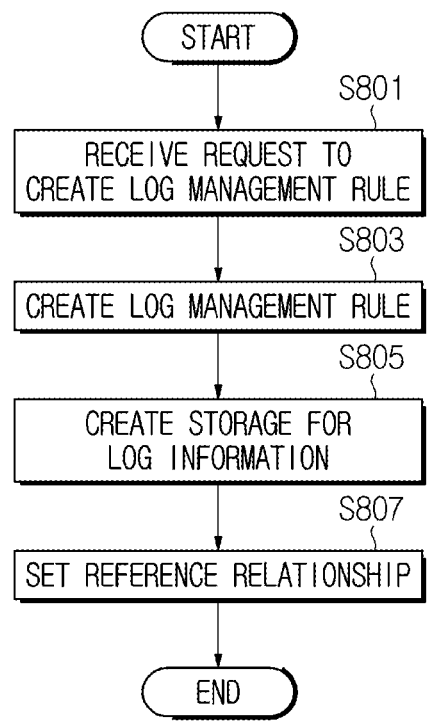
FIG. 8 illustrates an example of a procedure for creating a log management rule in an M2M system according to the present disclosure.

FIG. 8 illustrates an example of a procedure for creating a log management rule in an M2M system according to the present disclosure. FIG. 8 exemplifies a method for operating a device (e.g., IN-CSE) for creating a log management rule. In the description referring to FIG. 8, the operation subject is referred to as "device".

Referring to FIG. 8, at step S801, the device receives a request to create a log management rule. In other words, the device receives a message for requesting to create a new log management rule resource. According to an embodiment, the message may include information necessary for creating the logMgtRule resource. For example, the information necessary for creating the logMgtRule resource may include information indicating a content of a log management rule.

At step S803, the device creates the log management rule. The log management rule may be created in a form of logMgtRule resource. The log management rule includes a plurality of attributes. For example, the plurality of attributes may include at least one of information indicating time of a logging operation (e.g., start time and end time), information indicating information or an operation that is subject to logging, information defining a format of log information, a creation condition of log information, information on a target resource that will be logged, and information indicating storage that will store log information.

At step S805, the device creates storage for log information. The device may also create storage for storing log information that will be created according to the log management rule created at step S803. The storage may be created in a form of a logStorage resource. The storage may include sub-places for relevant resources respectively. Herein, a sub-place may be created after a corresponding resource is created.

At step S807, the device sets a reference relationship. The reference relationship means a correlation in which resources are interworking. The reference relationship may be set by storing information indicating a second resource in a specific attribute of a first resource. In logging, a log management rule, storage for storing log information and a resource to which the log management rule is applied are in a tripartite reference relationship. Since there is still no resource to which the log management rule is applied, the device sets the reference relationship between the log management rule and storage. Specifically, the device sets a value of one (e.g., logStorage) of attributes of the log management rule as information indicating the storage.

According to an embodiment described with reference to FIG. 8, the device (e.g., IN-CSE) completes preparation for creating a resource that is required to be applied with a log management rule by creating the log management rule. Accordingly, when a new resource is created, the device may apply the log management rule to the created resource.

Figure 9:
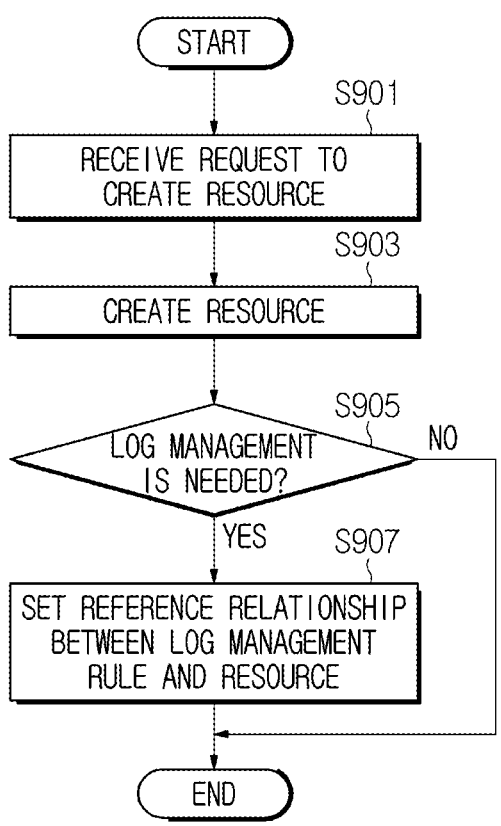
FIG. 9 illustrates an example of a procedure for creating a target resource of log management in an M2M system according to the present disclosure.

FIG. 9 illustrates an example of a procedure for creating a target resource of log management in an M2M system according to the present disclosure. FIG. 9 exemplifies a method for operating a device (e.g., IN-CSE) for creating log information. In the description referring to FIG. 9, the operation subject is referred to as "device".

Referring to FIG. 9, at step S901, the device receives a resource creation request. In other words, the device receives, from an AE, a message for requesting to create a resource.

At step S903, the device creates the resource. The device creates a resource that is requested at step S901. Next, although not shown in FIG. 9, the resource may be used to store information on the AE.

At step S905, the device determines whether or not log management is needed. In other words, the device checks whether or not creation and recording of log information on the resource created at step S903 are requested. Whether or not log management is needed may be determined based on the message received at step S901. That is, when the received message includes information indicating that the resource is subject to logging and information indicating a log management rule to be applied to the logging of the resource, the device determines that log management is needed. In case that log management is not needed, the device ends this procedure.

On the other hand, when log management is needed, at step S907, the device sets a reference relationship between the log management rule and the resource. Since the created resource is subject to log management, the device associates the resource to the log management rule. Specifically, the device includes, in the resource, an attribute (e.g., logIndication) configured as information, which indicates that the resource is subject to logging, and an attribute (e.g., eventLogID) configured as information indicating the log management rule to be applied to the logging of the resource.

Figure 10:
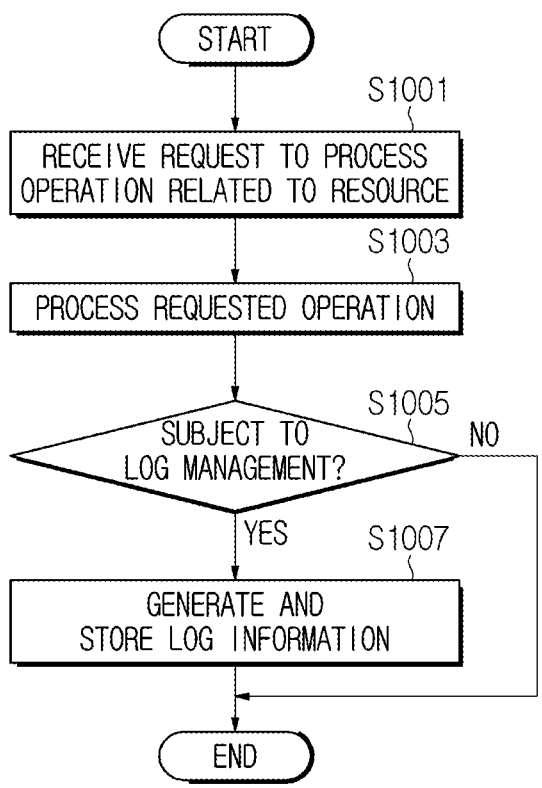
FIG. 10 illustrates an example of a procedure for creating log information in an M2M system according to the present disclosure.

FIG. 10 illustrates an example of a procedure for creating log information in an M2M system according to the present disclosure. FIG. 10 exemplifies a method for operating a device (e.g., IN-CSE) for creating log information. In the description referring to FIG. 10, the operation subject is referred to as "device".

Referring to FIG. 10, at step S1001, a device receives a request to process an operation related to a resource. The operation is requested, by a second AE, in respect to a resource created by a first AE and may be at least one of CREATE, RETRIEVE, DELETE, UPDATE and NOTIFY.

At step S1003, the device processes the requested operation. For example, when RETRIEVE is requested, the device reads information on the resource and transmits the read information to the second AE. However, although not shown in FIG. 10, in case the second AE has no authority for the requested operation, the device may end this procedure without processing the requested operation.

At step S1005, the device checks whether or not the resource related to the operation is subject to log management. By checking a value of at least one of attributes included in the resource, the device may check whether or not the resource is subject to the log management. For example, the resource may include an attribute (e.g., log-Indication) configured as information indicating that the resource is subject to logging, and the device may check whether or not the resource is subject to the log management by checking whether or not the attribute is set to a positive value. When the resource is not subject to the log management, the device ends this procedure.

If the resource is subject to the log management, at step S1007, the device creates and stores log information. The log information is created according to a log management rule and is stored in a resource that is designated in the log setting rule. Herein, the log management rule thus applied is indicated by an attributed included in the resource that is a target of the operation request. That is, the device checks the applied log management rule based on an attribute included in the resource, creates log information based on the log management rule thus checked, and creates the log information in storage indicated by the attribute included in the log management rule. However, based on a determination result according to the log management rule, when a condition of logging is not satisfied, the device may skip this step.

As in the embodiment described by referring to FIG. 10, log information may be created and stored. As described above, when the second AE has no authority for a requested operation, the device may not process the requested operation. Herein, according to another embodiment, the device may create and store log information on a failed event. For example, when a log management rule is set to log a failed event, that is, a rejected request, the device may create and store log information on the rejected operation.

Figure 11:
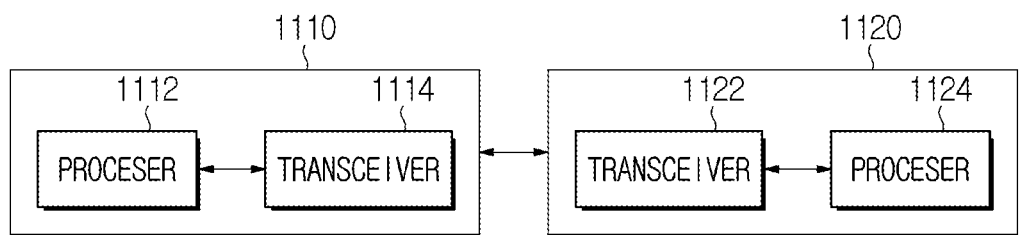
FIG. 11 illustrates a configuration of an M2M device in an M2M system according to the present disclosure.

FIG. 11 illustrates a configuration of an M2M device in an M2M system according to the present disclosure. An M2M device 1110 or an M2M device 1120 illustrated in FIG. 11 may be understood as hardware functioning as at least one among the above-described AE, CSE and NSE.

Referring to FIG. 11, the M2M device 1110 may include a processor 1112 controlling a device and a transceiver 1114 transmitting and receiving a signal. Herein, the processor 1112 may control the transceiver 1114. In addition, the M2M device 1110 may communicate with another M2M device 1120. The another M2M device 1120 may also include a processor 1122 and a transceiver 1124, and the processor 1122 and the transceiver 1124 may perform the same function as the processor 1112 and the transceiver 1114.

As an example, the originator, the receiver, AE and CSE, which are described above, may be one of the M2M devices 1110 and 1120 of FIG. 11, respectively. In addition, the devices 1110 and 1120 of FIG. 11 may be other devices. As an example, the devices 1110 and 1120 of FIG. 11 may be communication devices, vehicles, or base stations. That is, the devices 1110 and 1120 of FIG. 11 refer to devices capable of performing communication and are not limited to the above-described embodiment.

The above-described exemplary embodiments of the present disclosure may be implemented by various means. For example, the exemplary embodiments of the present disclosure may be implemented by hardware, firmware, software, or a combination thereof.

The foregoing description of the exemplary embodiments of the present disclosure has been presented for those skilled in the art to implement and perform the disclosure. While the foregoing description has been presented with reference to the preferred embodiments of the present disclosure, it will be apparent to those skilled in the art that various modifications and variations can be made in the present disclosure without departing from the spirit or scope of the present disclosure as defined by the following claims.

Accordingly, the present disclosure is not intended to be limited to the exemplary embodiments shown herein but is to be accorded the widest scope consistent with the principles and novel features disclosed herein. In addition, while the exemplary embodiments of the present specification have been particularly shown and described, it is to be understood that the present specification is not limited to the above-described exemplary embodiments, but, on the contrary, it will be understood by those skilled in the art that various changes and modifications may be made without departing from the spirit and scope of the present specification as defined by the claims below, and such changes and modifications should not be individually understood from the technical thought and outlook of the present specification.

In this specification, both the disclosure and the method disclosure are explained, and the description of both inventions may be supplemented as necessary. In addition, the present disclosure has been described with reference to exemplary embodiments thereof. It will be understood by those skilled in the art that various changes in form and details may be made therein without departing from the essential characteristics of the present disclosure. Therefore, the disclosed exemplary embodiments should be considered in an illustrative sense rather than in a restrictive sense. The scope of the present disclosure is defined by the appended claims rather than by the foregoing description, and all differences within the scope of equivalents thereof should be construed as being included in the present disclosure.

What is claimed is:

1. A method for operating a machine-to-machine (M2M) device in an M2M system, the method comprising:
receiving a first message for requesting to create a log management rule;
creating the log management rule and storage for storing log information to be generated according to the log management rule; and
setting a reference relationship between the log management rule and the storage,
wherein the log management rule indicates a format of the log information, and wherein the log information includes information related to activities on a specified resource.

2. The method of claim 1, wherein the log management rule is created in a form of resource for a log management, and wherein the resource for the log management includes at least one of information indicating a time of a logging operation, information that is subject to logging or information specifying an operation, information defining the format, a creation condition of the log information, information on a target resource to be logged, and information indicating the storage for storing the log information.

3. The method of claim 1, wherein the reference relationship is set by including an attribute indicating the storage in the log management rule.

4. The method of claim 1, further comprising:
receiving a second message for requesting to create a resource according to the log management rule;
creating the resource based on information in the second message; and
setting the reference relationship between the resource and the log management rule.

5. The method of claim 4, wherein the second message includes at least one of information indicating that the resource is subject to logging, and information indicating the log management rule to be applied to logging of the resource.

6. The method of claim 4, wherein the reference relationship is set by including an attribute indicating the log management rule in the resource.

7. The method of claim 4, further comprising:
receiving a third message for requesting an operation for the resource;
performing the operation requested by the third message;
generating the log information on the operation based on the log management rule; and
storing the log information.

8. The method of claim 7, wherein the generating of the log information comprises determining, based on the log management rule, whether or not the operation is that is requested subject to logging.

9. The method of claim 7, wherein the generating of the log information comprises determining, based on the log management rule, whether a reception time of the third message corresponds to a time of a logging operation.

10. A machine-to-machine (M2M) device in an M2M system, the M2M device comprising:
a transceiver configured to receive and transmit a signal; and
a processor configured to control the transceiver,
wherein the processor is further configured to:
receive a first message for requesting to create a log management rule,
create the log management rule and storage for storing log information to be generated according to the log management rule, and
set a reference relationship between the log management rule and the storage,
wherein the log management rule indicates a format of the log information, and
wherein the log information includes information related to activities on a specified resource.

11. The M2M device of claim 10, wherein the log management rule is created in a form of resource for a log management, and wherein the resource for the log management includes at least one of information indicating a time of a logging operation, information that is subject to logging or information specifying an operation, information defining the format, a creation condition of the log information, information on a target resource that will be logged, and information indicating the storage that will store the log information.

12. The M2M device of claim 10, wherein the processor is further configured to:
receive a second message for requesting to create a resource according to the log management rule,
create the resource based on information in the second message, and
set the reference relationship between the resource and the log management rule.

13. The M2M device of claim 12, wherein the processor is further configured to:
receive a third message for requesting an operation for the resource,
perform the operation requested by the third message,
create log information on the operation based on the log management rule, and
store the log information.

14. A machine-to-machine (M2M) device in an M2M system, the M2M device comprising:
a transceiver configured to receive and transmit a signal; and
a processor configured to control the transceiver,
wherein the processor is further configured to:
transmit a first message for requesting to create a resource, which is subject to logging, based on a log management rule, and
receive a second message for notifying that creation of the resource is completed,
wherein the first message includes first information indicating that the resource to be created is subject to the logging and second information indicating the log management rule,
wherein the log management rule indicates a format of information, and
wherein the log information includes information related to activities on a specified resource.

15. The M2M device of claim 14, wherein the log management rule defines at least one of information indicating a time of a logging operation, information that is subject to the logging or information specifying an operation, information defining the format, a creation condition of the log information, information on a target resource that will be logged, and information indicating storage that will store the log information.

* * * * *